United States Patent Office 2,885,047
Patented May 5, 1959

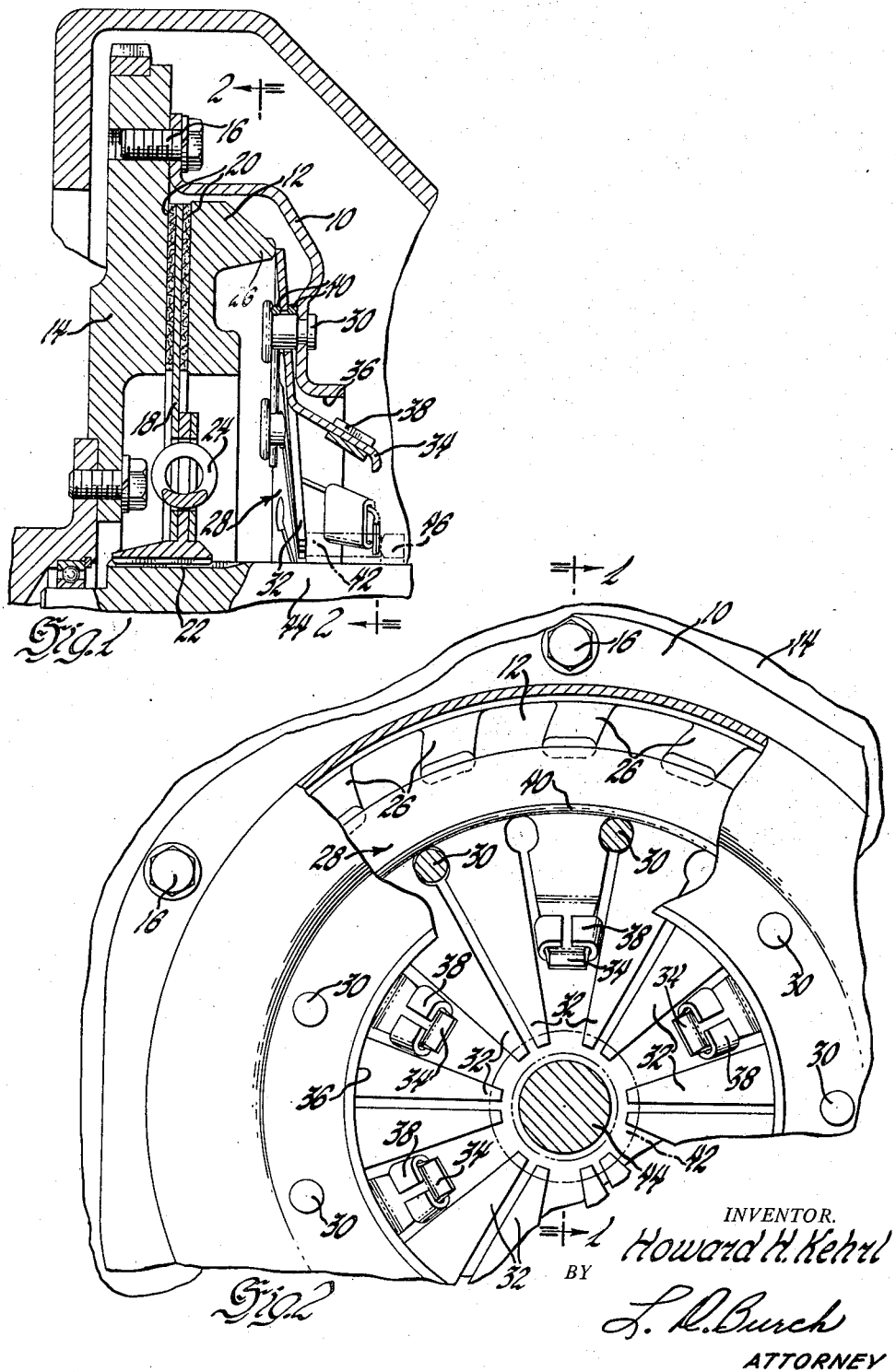

2,885,047

CLUTCH ASSEMBLY

Howard H. Kehrl, Birmingham, Mich., assignor to General Motors Corporation, Detroit, Mich., a corporation of Delaware Application July 18, 1957, Serial No. 672,790

10 Claims. (Cl. 192—68)

This invention relates to clutch assemblies in general and more particularly to diaphragm spring clutch assemblies which are used with manually operated transmissions in automotive vehicles.

Diaphragm spring clutch assemblies include a coned or dished Belleville type diaphragm spring which is secured to the clutch cover and is arranged and disposed to effect a biasing effort against the clutch pressure plate to frictionally engage a driven disc between the pressure plate and the engine driven flywheel. The biasing effort is released by a release pressure applied to the inner periphery of the spring member which causes the outer periphery thereof to back off from the pressure plate.

Some of the problems in designing an acceptable diaphragm spring actuator for vehicle clutch assemblies include having the diaphragm spring sufficiently stiff to provide adequate biasing of the pressure plate at all engine speeds and still sufficient flexibility to react to a moderate release pressure. It is also highly desirable to avoid the snap action tendency inherent in a dished diaphragm spring since a rapid return of the spring to a biasing position will cause the pressure plate to grab at the driven disc with a resulting wear of the friction facings of the driven disc and an undue and erratic surge of power through the drive line. Among other considerations, related more to the over-all clutch assembly, the circulation of cooling air over the friction heated pressure plate could also be improved.

Some of these and other problems are found to be less serious in a clutch assembly which includes a diaphragm spring having weighted spring fingers, after the teachings of Geyer 2,234,756, and particularly with certain significant improvements in the arrangement and disposition of the weighted spring fingers as hereafter disclosed.

It is an object of this invention to provide a diaphragm clutch spring having weighted spring fingers bent out of the normal plane of the spring fingers and disposed to take greater advantage of the effects of centrifugal force thereon.

It is another object of this invention to have such spring fingers arranged to continuously bias the clutch pressure plate in driving engagement and to avoid an over-center snap action disposition thereof.

It is also an object of this invention to have weighted spring fingers which are appreciably less subject to the effects of centrifugal force thereon in affecting a release of the clutch biasing force.

A further object of this invention is to avoid restraining the weighted spring fingers of the clutch spring and consequently unduly limiting the full capacity of the clutching action.

A still further object of this invention is to avoid having the spring fingers of the spring member engage the clutch release bearing and cause premature failure thereof.

Still another object of this invention is to afford a greater flow of cooling air over the clutch pressure plate and between the spring fingers of the clutch spring.

In following the teachings of this disclosure, a diaphragm spring clutch assembly may be provided which has a clutch spring of lighter gauge without a sacrifice of biasing effort and in which the cone angle, finger thickness or width, spring finger lever arm ratio, and other factors may be varied to obtain any desired load well below presently accepted stress values.

In the drawings:

Figure 1 is a cross-sectioned view of a part diaphragm spring clutch assembly embodying features of this invention and as seen in the plane of line 1—1 of Figure 2.

Figure 2 is an end view of the part of the diaphragm clutch assembly shown in Figure 1 and as seen substantially in the plane of line 2—2 thereon.

In the illustrated clutch assembly the clutch cover 10 and pressure plate 12 are secured to the engine flywheel 14 for rotation therewith. The cover member is bolted directly to the flywheel, as shown at 16, while the pressure plate is secured to the flywheel by flexible straps (not shown) that allow relative axial movement between the flywheel and pressure plate.

A driven disc 18, including friction facings 20, is splined to the transmission clutch gear 22, and is disposed between the pressure plate 12 and flywheel 14. The driven disc 18 is shown to include torque transmitting and cushioning springs 24.

The pressure plate 12 has its outer extremity formed to include ribs 26 which are disposed and arranged to act as a centrifugal blower while rotating for circulating cooling air over the pressure plate.

The cover 10 is formed to enclose the driven disc 18 and pressure plate 12 and has a Belleville type diaphragm spring 28 mounted within the cover on pivot pins 30. The outer periphery of the diaphragm spring engages the ribs 26 of the pressure plate and the spring is dished or conical in form to normally apply a pressure on the pressure plate 12 which in turn holds the driven disc 18 in contact with the flywheel 14. The diaphragm spring 28 is formed to include radially disposed inwardly extending and tapered fingers 32 by means of which the spring may be flexed to relieve the biasing effort which urges the pressure plate toward the flywheel.

Several of the spring fingers 32 are bent out of the plane of the other fingers to form lever arms 34 extending on the side of the spring toward the cover opening 36. Small one-ounce weights 38 are secured to the ends of the deformed spring fingers levers 34 and in the course of operation of the disclosed clutch assembly are subject to the effects of centrifugal force as will be described.

Pivot rings 40 are disposed on each side of the diaphragm spring and around the pivot pins 30 to serve as a fulcrum for the movement of the diaphragm spring.

The clutch operating means includes a throw-out or release bearing 42, shown in phantom disposed about the transmission clutch shaft 44. The release bearing is engaged with the ends of spring fingers 32 by a yoke arm 46, a part of which is also shown in phantom, and which is in turn operated by the clutch pedal mechanism (not here shown).

In the commonly known diaphragm spring type clutch assembly, the release bearing 42 is engaged with each of the inwardly extended tapered spring fingers of the diaphragm spring as it is moved toward the pressure plate 12 to pivot or flex the diaphragm spring about the outermost of the pivot rings and retract the outer periphery of the spring from engagement with the pressure plate and thereby effect the release of the driven disc.

The release bearing is retracted when the yoke arm pressure is relieved and the tendency of the diaphragm spring to return to its normal dished shape becomes greater than the effort to deform the spring. Because of the over-center action of the conventional diaphragm spring, a snap action may result which causes the spring to re-engage the driven disc between the flywheel and pressure plate so rapidly as to grab and cause a quick and erratic surge of power through the drive line. The driven disc usually includes torque transmitting and cushioning springs, such as 24, to counteract this surge of driving power.

In the operation of the proposed clutch assembly, including the diaphragm spring 28 with its bent and weighted spring fingers 34, the greater the engine speed the greater is the centrifugal force effect on the weighted fingers to increase their radius of rotation and thereby increase the biasing effort of the spring member on the pressure plate 12. In having the weights 38 disposed at the ends of the spring fingers 34 and in having the spring fingers bent axially and well out of the plane of the spring, the full effect of the centrifugal force is taken advantage of in biasing the outer periphery of the spring member against the pressure plate 12.

Although it would be expected that a much greater clutch pedal effort would be required to move the release bearing 42 to flex the straight spring fingers 32 and retract the spring member from engagement with the pressure plate 12, under the added effect of the centrifugal biasing force, this has been found not to be so.

The spring rate built into the straight fingers 32, the disposition of the pivot pins 30, etc., are designed to best cope with the most frequent clutch operating conditions which, quite naturally, are in the range of lower engine speeds. Consequently, no greater clutch pedal effort need be required at low engine speeds. At higher engine speeds, as the diaphragm spring 28 is being retracted, the spring finger weights 38 on the bent fingers 34 are moved toward their axis of rotation and the centrifugal effect for any given speed is increasingly reduced. The reduction in the centrifugal force effort is greater than if the weights 38 were secured directly to the straight fingers 32 since the weights are moved in an arc with the bent fingers about the pivot pins 30 and toward their axis of rotation. Further, the leverage ratio in releasing the spring biasing pressure through the straight spring fingers 32 is greater than the leverage ratio in applying the biasing force through the bent and weighted fingers 34 so that less than the applying force is required and this force is increasingly less as the weights move inwardly.

It is to be noted that the weights 38 are disposed sufficiently out of the plane of the spring disc that they are not carried past or over-center of the pivot pins 30 in disengaging the clutch. Consequently, the centrifugal force effect is always active in biasing the outer periphery of the diaphragm spring toward the pressure plate and in counteracting any over-center snap action tendency of the spring itself.

In clutches having weights fixed to the straight spring fingers, the centrifugal effect acts on the inner ends of the weighted straight fingers to urge them toward and into engagement with the release bearing. This limits the movement of the weighted fingers and consequently unduly restricts the holding capacity of the clutch at high engine speeds as well as causes unintentional rotation of the release bearing and premature failure thereof.

Although these undesirable effects may be compensated for by increasing the initial setting of the release bearing clearance, that in turn requires increasing the clutch pedal travel which of itself is undesirable.

The proposed clutch spring construction, with the bent and weighted spring fingers, avoids these objections and eliminates the problems since the weighted fingers 34 are shortened in being bent so that they never contact the release bearing 42. The remaining straight and unweighted spring fingers 32 are only slightly affected by the weighted fingers 34, as regards movement toward the release bearing under the effects of centrifugal force on the weighted fingers, since the leverage action of the weighted arms, through the pivot pins 30 to the outer periphery of the diaphragm spring 28 moves the outer periphery of the spring into more secure engagement with the pressure plate 12 but actually moves the spring an insignificant amount as regards any leverage action, back through the straight spring fingers to move the inner ends thereof.

A further advantage in having some of the diaphragm spring fingers bent out of their normal plane is obtained in having a greater cooling air inlet access provided at the clutch cover opening 36.

Normally, cooling air would be required to be drawn between the straight spring fingers 32. With all of the fingers straight there is limited access for the cooling air which is drawn through the clutch cover 10 by the centrifugal fan arrangement of the pressure plate rib portions 26.

The spring fingers 34 being bent out of the plane of the spring provide additional access for cooling air and greatly improves the circulation of air around the release bearing and over the pressure plate to dissipate the heat of friction in these members. Since the weighted spring fingers are further opened at high engine speeds, the circulation of cooling air is then even more improved.

The aforementioned and other advantages become more apparent in the further study and use of the teachings here set forth.

What I claim is:

1. In a clutch, a driving member and a spring disc rotatable therewith and prestressed to effect clutch engagement, a plurality of lever arm fingers formed from said spring disc and bent out of the plane of said spring disc and on one side thereof, said lever arms having weights secured to the ends thereof and being disposed to increase the clutch engaging pressure of said spring under the influence of centrifugal force, and means operably disposed for engagement with said spring disc to release the clutch and for moving said weights toward a more neutral axis in an arc with said lever arms for reducing the effect of centrifugal force and the effort required for the release of said clutch.

2. The clutch of claim 1 having said lever arm fingers disposed free from engagement with said spring disc release means to avoid limiting the capacity of said clutch and undue wear of said release means.

3. A clutch assembly having spaced and relatively axially movable driving members and a driven member disposed therebetween, a spring disc formed over a plurality of radially and inwardly extending fingers with different of said fingers bent out of the plane of the other of said fingers, said spring disc having its outer periphery yieldingly engaged with one of said driving members and being pivotally mounted for retraction of its outer periphery, means operably disposed to engage the bers and being pivotally mounted for retraction of its outer periphery, means operably disposed to engage the inner periphery of said unbent spring fingers formed from said spring disc for retracting said spring, and a plurality of weights mounted upon one side of said bent spring fingers, said last named fingers being completely displaced from the plane of said disc for movement in an arc about said spring disc pivot outwardly to increase the spring pressure engagement with said one driving member under the effects of centrifugal force and inwardly to reduce the centrifugal force effect as the inner periphery of said spring is displaced.

4. In the clutch assembly of claim 3, said weights being sufficiently displaced out of the plane of said disc that the arc of travel thereof will not pass over said spring pivot to assist the retraction of said spring.

5. In the clutch assembly of claim 3 said weights being at all times disposed free from engagement with said spring retraction means.

6. In a friction clutch assembly comprising an engine flywheel having a cover member secured thereto, an axially movable pressure plate mounted within said cover member, a driven shaft axially aligned with said flywheel and received within said cover member, a friction faced driven disc engaged with said shaft and disposed between said flywheel and said pressure plate, a diaphragm spring mounted within said cover member and formed and disposed to have the outer periphery thereof in biasing engagement with said pressure plate for engaging said driven disc between said flywheel and pressure plate, and a release bearing disposed about said driven shaft and axially movable for engagement with the inner periphery of said diaphragm spring; said diaphragm spring comprising a flat annular disc having a plurality of radially and inwardly extending spring controlling fingers formed therefrom with different of said fingers bent out of the plane of other of said fingers and disposed rearwardly of said pressure plate and receptive to the effects of centrifugal force thereon to a greater extent than said other fingers.

7. The friction clutch assembly of claim 6 wherein said bent spring fingers include weights secured on the ends thereof to further accentuate the effects of centrifugal force thereon.

8. The friction clutch assembly of claim 7 having said weighted spring fingers disposed free of engagement with said release bearing.

9. In a clutch assembly comprising spaced and relatively axially movable driving members having a driven member engageably disposed therebetween, a disc spring yieldingly engaging one of said driving members toward the other thereof and including a plurality of radially and inwardly disposed spring fingers for operating said disc spring, said one driving member having a face near the outer periphery thereof formed to induce the flow of cooling air between said spring fingers and over said one driving member, and said disc spring having some of said spring fingers removed from the normal plane thereof for enlarging the inlet access for said cooling air.

10. The clutch assembly of claim 9 having those spring fingers which are removed from the normal plane of said disc spring bent axially outward and including weights secured to the ends thereof, said weights, under the influence of centrifugal force, further removing said fingers from their normal plane for further enlarging the inlet access afforded said cooling air.

References Cited in the file of this patent

UNITED STATES PATENTS

| | | |
|---|---|---|
| 2,003,817 | Almen | June 4, 1935 |
| 2,045,557 | Almen et al. | June 23, 1936 |
| 2,115,763 | Burke | May 3, 1938 |
| 2,234,756 | Geyer | Mar. 11, 1941 |
| 2,241,241 | Clouse | May 6, 1941 |

UNITED STATES PATENT OFFICE
CERTIFICATE OF CORRECTION

Patent No. 2,885,047

May 5, 1959

Howard H. Kehrl

It is hereby certified that error appears in the printed specification of the above numbered patent requiring correction and that the said Letters Patent should read as corrected below.

Column 4, lines 59 and 60, strike out "bers and being pivotally mounted for retraction of its outer periphery, means operably disposed to engage the".

Signed and sealed this 8th day of September 1959.

(SEAL)
Attest:

KARL H. AXLINE
Attesting Officer

ROBERT C. WATSON
Commissioner of Patents